June 5, 1951 W. F. BERCK 2,555,629
TWO CYLINDER FLUID METER
Filed Sept. 30, 1944 5 Sheets-Sheet 1

INVENTOR.
WILLIAM F. BERCK
BY Oscar A. Mellin
HIS ATTY.

June 5, 1951 W. F. BERCK 2,555,629
TWO CYLINDER FLUID METER
Filed Sept. 30, 1944 5 Sheets-Sheet 2

INVENTOR.
WILLIAM F. BERCK
BY Oscar A. Mellin
HIS ATTY.

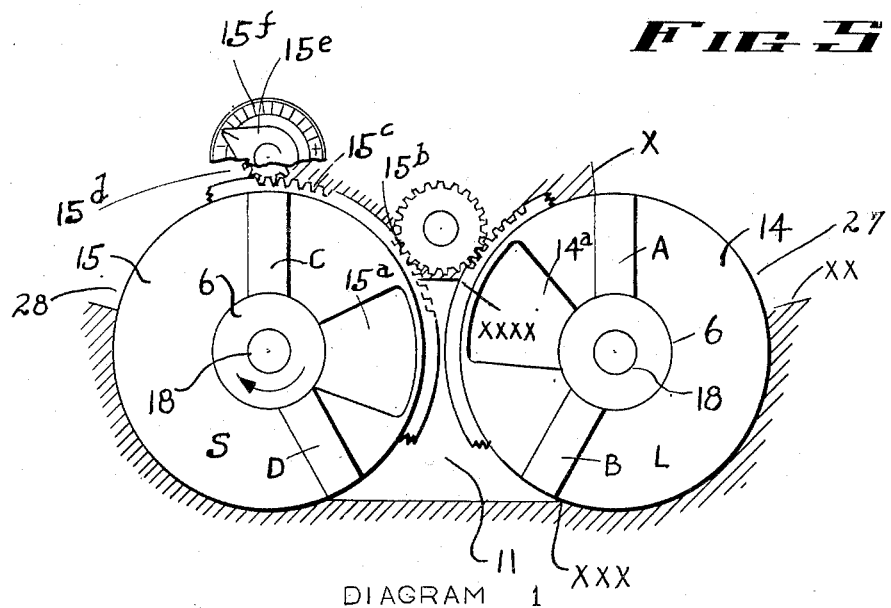
DIAGRAM 1
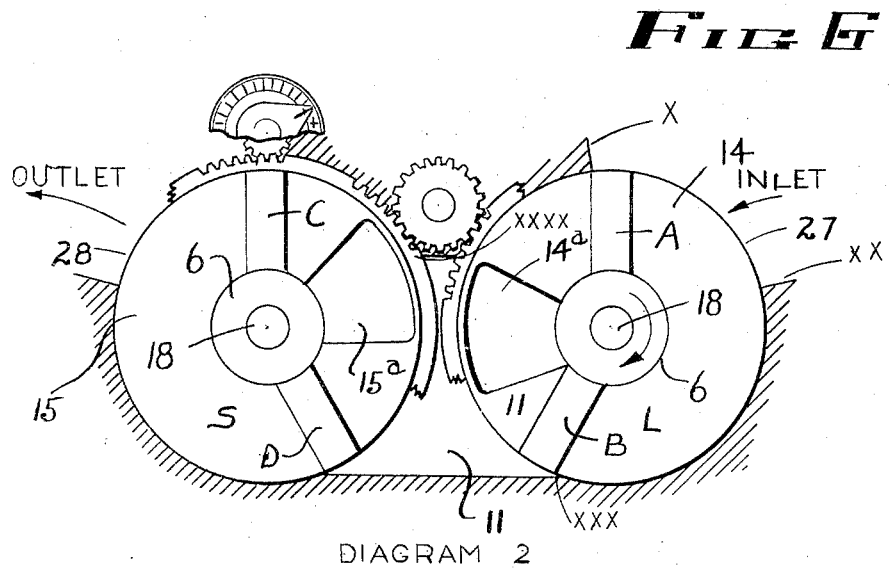
DIAGRAM 2

FIG.7
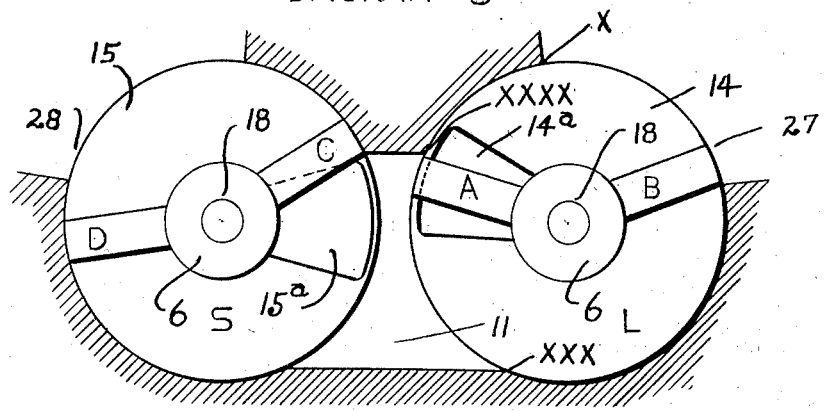
DIAGRAM 3
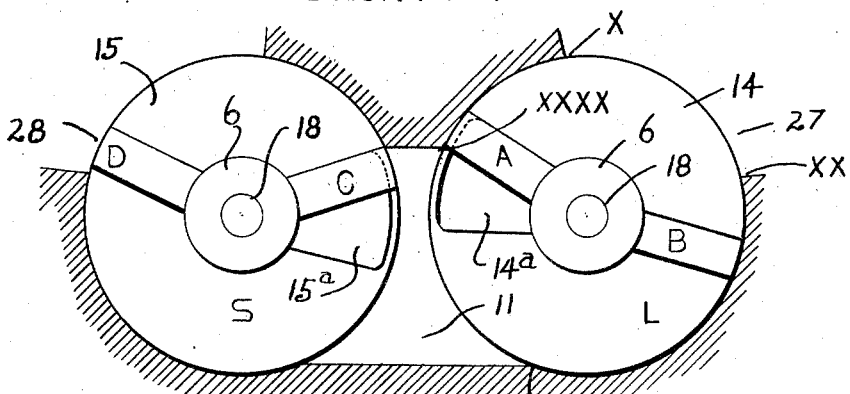
DIAGRAM 4
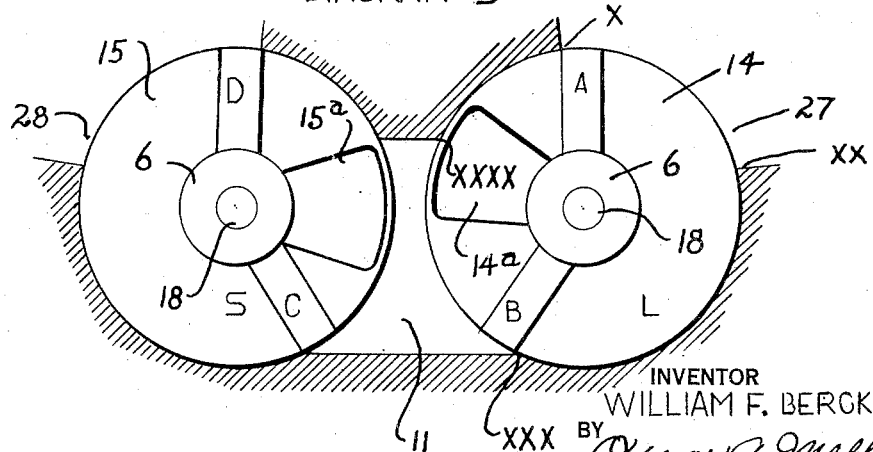
DIAGRAM 5
INVENTOR
WILLIAM F. BERCK
BY Oscar A. Mellin
ATTORNEY June 5, 1951 W. F. BERCK 2,555,629
TWO CYLINDER FLUID METER
Filed Sept. 30, 1944 5 Sheets-Sheet 5
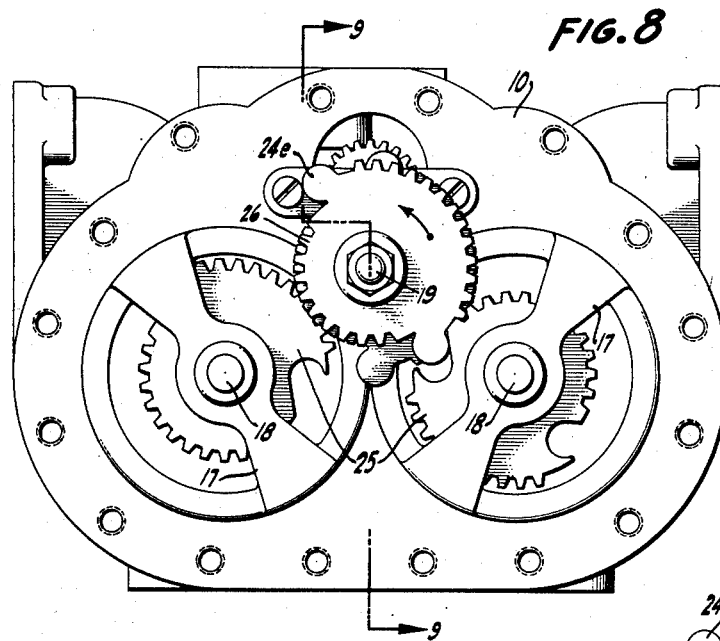
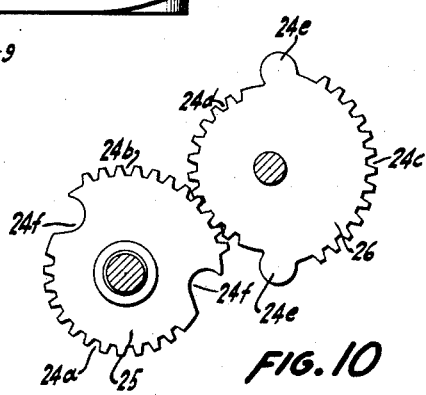
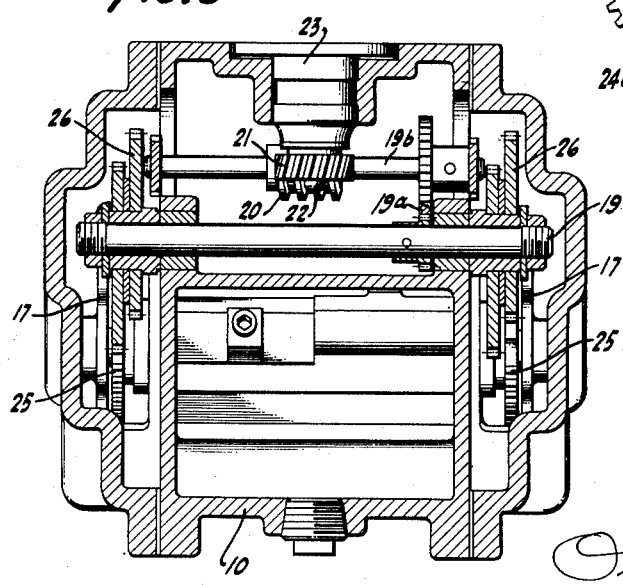
INVENTOR.
WILLIAM F. BERCK
BY
Oscar A. Mellem
ATTORNEY Patented June 5, 1951

2,555,629

UNITED STATES PATENT OFFICE 2,555,629

TWO-CYLINDER FLUID METER

William F. Berck, Oakland, Calif., assignor to Ralph N. Brodie Company, Oakland, Calif., a corporation of California Application September 30, 1944, Serial No. 556,637

6 Claims. (Cl. 73—253)

This application is a companion case of my copending application entitled "Two Cylinder Rotary Meter," filed September 30, 1944, bearing Serial No. 556,638, which has matured into Patent Number 2,531,903.

This invention relates to fluid meters of the rotary vane type of the character disclosed in my aforesaid application.

It is the principal object of my present invention to provide meters of the character referred to with simple and efficient means of calibration by enabling the displacement thereof to be varied.

In practice I provide a meter having two cylindrical metering chambers, each traversed by two vanes which revolve in cycles of different stages about the axis of the chambers in relatively timed relation. The stages of the cycle of each vane are timed in relation to the inlet and outlet ports, so that the fluid pressure from the inlet port operates the vanes and the same act successively to displace a precise amount of fluid through the outlet port during each cycle with a minimum of energy loss. Each metering chamber is provided with by-pass ports, the position of which may be adjusted. By adjustment of the position of the by-pass ports the effective displacement stroke of the vanes may be changed to vary the displacement of the meter.

One form which the invention may assume is exemplified in the following description and illustrated by way of example in the accompanying drawings, in which:

Figs. 5 and 6 are diagrammatic views showing the manner of adjustment of the by-pass ports and the range of their adjustment.

Fig. 7 discloses a group of three diagrams, disclosing the cycle of operation of the vanes.

Fig. 8 is an end view with the cover plate removed of a meter embodying the preferred form of my invention and disclosing the gearing connection between the vanes and for operating the meter counter.

Fig. 9 is a longitudinal section through the meter taken on line 9—9 of Fig. 8.

Fig. 10 is a view showing a gear set for one vane.

Figure 1:
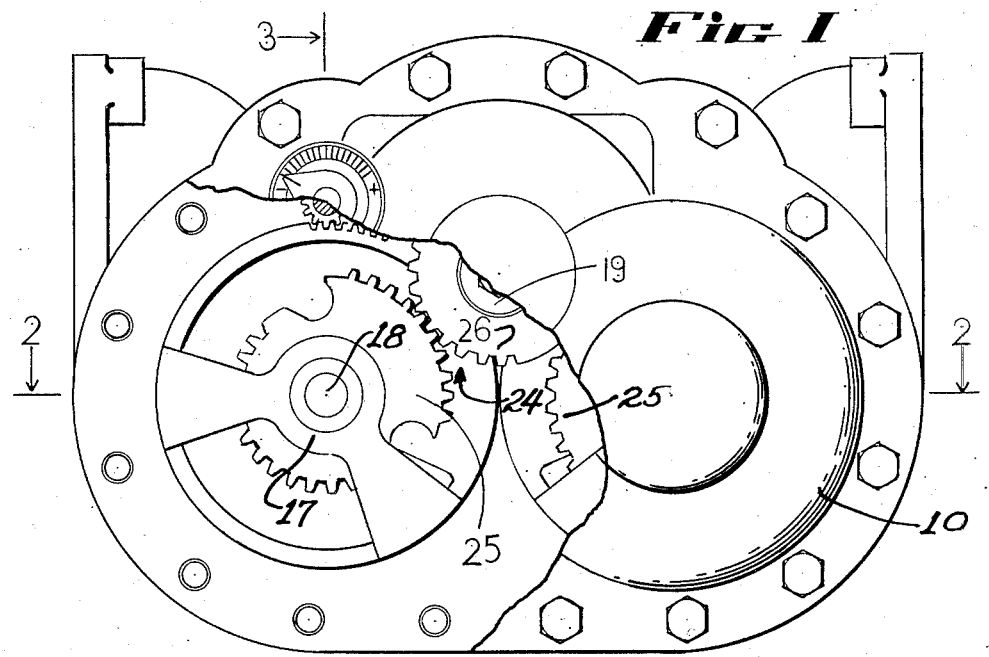
Fig. 1 is an end view of a meter embodying the preferred form of my invention, with parts broken away to disclose certain features of construction.
Figure 2:
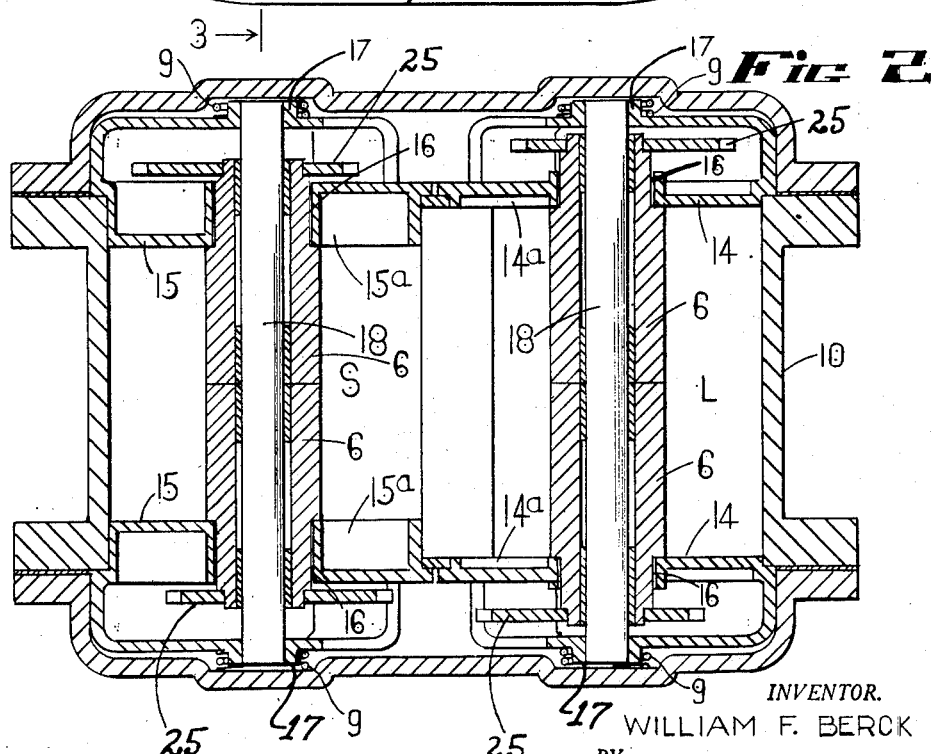
Fig. 2 is a central plan section through the meter taken on line 2—2 of Fig. 1.
Figure 3:
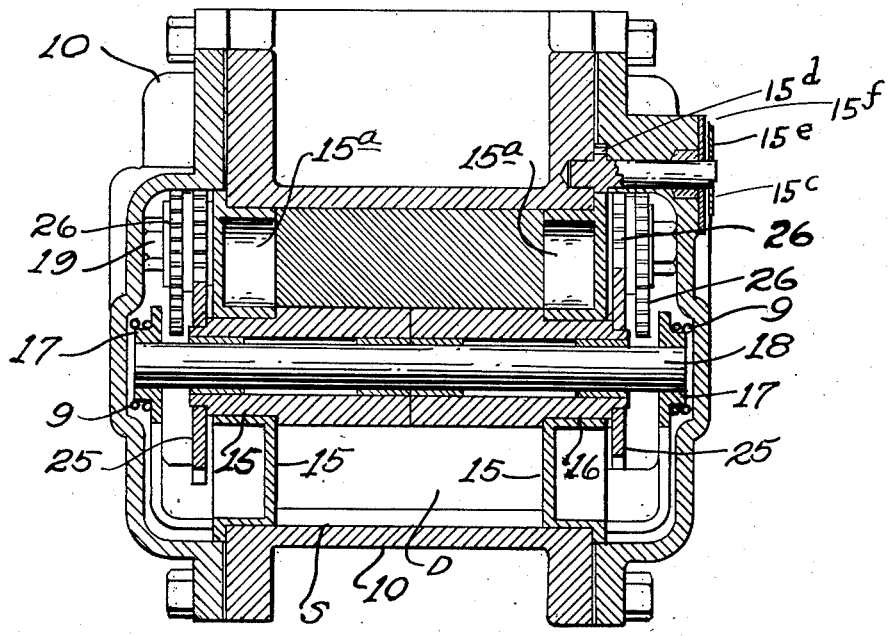
Fig. 3 is a vertical section through the meter taken on line 3—3 of Fig. 1.
Figure 4:
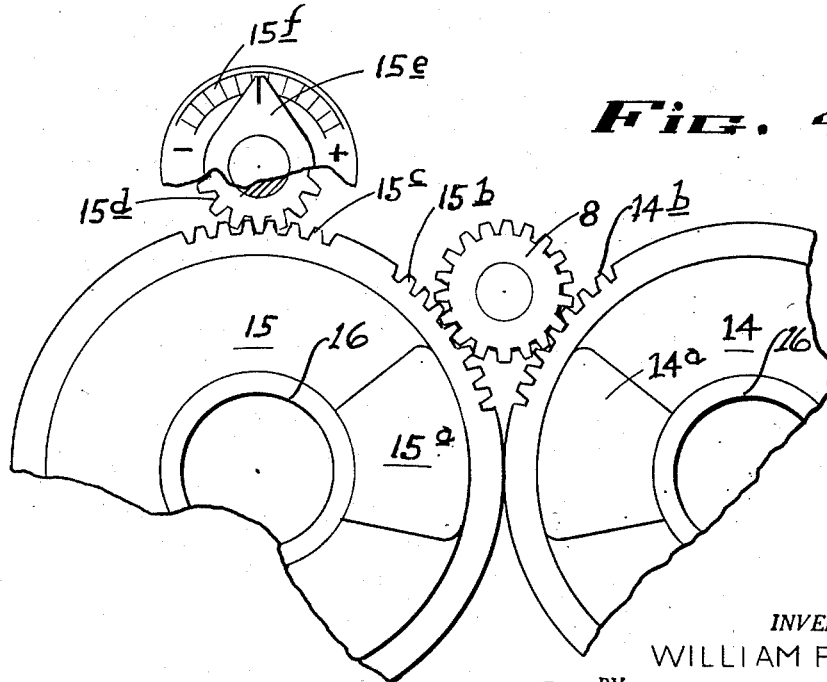
Fig. 4 is a fragmentary view in end elevation showing the rotatable connection between the head members of the metering chambers or cylinders and the manner of rotating the same.

Referring more particularly to the accompanying drawings, 10 indicates a meter casing having two straight cylindrical bores L and S arranged in side by side relationship and in parallelism. These bores or metering cylinders L and S extend longitudinally through the meter casing 10 from end to end. The interior of the metering cylinders L and S are in communication with each other through an intercommunicating port 11 formed through their adjacent side walls. This passageway 11 extends the full length of the cylinders L and S as illustrated. Enclosing the ends of the cylinder L are revoluble head members 14 which are mounted, as illustrated, in appropriate fashion to revolve about the axis of the cylinder L. The fit between the heads 14 and the bore of the cylinder L is such as to prevent leakage of fluid between the heads and the bore of the cylinder. As shown in Fig. 2, a spring 9 is disposed intermediate each of the heads 14 and the casing 10 which tend to hold the heads 14 snugly in position.

In a similar fashion head members 15 are spring pressed and fitted to the ends of the cylinder S. These head members 15 are likewise revolubly mounted and their fit with the bore of the cylinder S is likewise fluid-tight, although permitting the heads 15 to revolve.

The head members 14 are each provided with a by-pass port 14a which are in alignment. These by-pass ports 14a are in effect merely depressions or recesses formed in the inner faces of the head members 14. The sides of the recesses extend somewhat radially from the axial center of the cylinder as illustrated in Figs. 5 and 6.

Similar by-pass ports 15a are formed in the head members 15. These head members 15 extend inwardly of the cylinder S to a greater extent than the head members 14 extend into the cylinder L so that the capacity of the cylinder S for a given angular stroke of a displacing vane therein is less than the capacity of the cylinder L. It is intended that the by-pass ports 14a and 15a be employed to vary the effective displacement stroke of the vanes in the cylinders, as will be described, to thereby vary the displacement of the meter to enable it to be calibrated.

Fixed exterior covers forming part of the meter casing are, of course, arranged to overlie the rotatable heads 14 and 15, as illustrated in Fig. 2.

Disposed in the cylinder L are vanes A and B and disposed in the cylinder S are vanes C and D. These are rotatably mounted in the cylinders in the following fashion. Coaxially of each cylinder L and S the head members 14 and 15 thereof are formed with bores 16 which are in absolute longitudinal alignment. Exteriorly of the head members 14 and 15 and integral therewith and spaced therefrom are outboard bearing members 17 in which are mounted in a non-rotatable fashion the ends of vane bearing shafts 18. The shafts 18 are ordinarily stationary but may be turned on their axes for adjustments as will be described. The shaft 18 of each cylinder is, of course, disposed in absolute axial alignment with the cylinder. The vanes A, B, C and D are rotatably mounted in the cylinders on the vane shafts 18 in such a fashion that they will be relatively rotatable to a controlled extent, as will be hereinafter described. From the drawings, particularly Fig. 2, it will be seen that the two vanes of each cylinder each have a single bearing 6 approximately one-half the length of the shaft 18, which bearing is journalled on the shaft 18 and also in the adjacent head member through which it projects, all as illustrated.

The construction of the vane bearings 6 of the vanes is obvious from Fig. 2, where it will be seen that one of the vane bearings of each cylinder projects beyond one head member, while the other vane bearing 6 in said cylinder projects through the opposite head member. This is so that the vane bearing members may be associated and interconnected by an interconnecting driving mechanism so that all four of the vanes will operate in precise synchronism throughout the stages of their cycle of operation.

The driving mechanism referred to includes a jack shaft 19 journalled at both ends in the meter casing in parallelism with the vane bearing shafts 18 and, of course, exteriorly of the cylinders L and S. However, the jack shaft 19 is located at equal distances from the centers of the two vane shafts 18.

One purpose of the jack shaft 19 is to form a connecting drive between the vanes and a meter counter so as to drive the counter to indicate the quantity of fluid measured by the meter and discharged therefrom. The second purpose of the jack shaft is to form a part of an interconnecting drive mechanism between the vanes so that they will operate in synchronism, as will be described.

For the purpose of driving the meter counter, the jack shaft is operatively connected by drive mechanism to a meter counter customarily mounted on top of the meter casing for the purpose of driving the counter. For this purpose the jack shaft 19 is operatively connected by a gear train 19a to a worm shaft 19b, the latter of which is fitted with a worm 20 meshing with a worm wheel 21 on a meter counter drive shaft 22. A counter 23 is mounted in the top of the meter casing and is driven from the meter counter drive shaft 22. Inasmuch as the detailed construction of the counter 23 and its operative connection with the shaft 22 is conventional and forms no part of my present invention, it is not further illustrated or described.

Mounted on the bearings 6 of the vanes and on the jack shaft 19 are four sets of gears 24, there being one vane gear 25 for each vane and one jack shaft gear 26 in mesh therewith and fixed on the jack shaft 19. The vane gears 25 are, of course, each fixed on their respective vane bearing 6 and the jack shaft gears are, of course, fixed on the jack shaft 19. These sets of gears 24 operate in timed relation during the operation of the meter, as will be hereinafter described, to drive the jack shaft 19 at a constant rotative speed at any given inlet fluid pressure.

The metering cylinders L and S are provided with an inlet port 27 and an outlet port 28. The inlet port 27 communicates with the cylinder L, while the outlet port 28 communicates with the cylinder S. This is so that fluid pressure entering the inlet port 27 may enter into the cylinder L and thence into the cylinder S engaging the vanes A, B, C and D as the latter enter into their proper stages of operation, causing the vanes to be driven in a clockwise direction (with reference to Figs. 5 and 6) to discharge the metered fluid through the outlet port 28.

It is obvious from the drawings that the vanes each extend the full radial dimension of their respective cylinders L and S (which are of the same diameter) and contact the same at their outer peripheral edges. At their inner edges the vanes contact the periphery of the adjacent vane bearing 6 of the other vane in the cylinder so that each vane forms a complete moving partition in its metering cylinder. The ends of the vanes, of course, slidably engage the inner surfaces of the head members 14 and 15 at opposite ends of the cylinders L and S. The fits between the ends and outer and inner peripheral edges of the vanes and the walls of the metering cylinders L and S are substantially fluid-tight under the differential pressures to which a meter of this type is subjected.

As illustrated in the drawings, the outer peripheral edge of each vane is of a width subtending an angle of approximately fifteen degrees at the axis, although I do not wish to limit myself to this dimension in that I am aware that other dimensions are practical and can be used.

At the inlet side of the metering cylinder L the inlet port 27 commences at a point X short of the vertical center line at the top of the cylinder L and extends to a point XX short of the horizontal center line of the cylinder L. The outlet port 28 is of precisely the same angularity and at the same relative position with respect to the horizontal and vertical center lines of the cylinder S, but, of course, at the opposite side thereof. I prefer that the angularity of the intercommunicating port 11 be substantially the same as that of the inlet and outlet ports 27 and 28.

As previously described, each vane is associated with a set of gears 24 comprising a vane gear 25 fixed to its bearing 6 and a jack shaft gear 26 which, as previously described, is fixed to the jack shaft 19. All the sets of gears 24 are identical in construction and formation, although the jack shaft gears for the vanes A, B, C and D are relatively timed or set so as to be out of phase with one another and so that the phase difference is 90°.

Reference being had to the drawings, it will be seen that the vane gear 25 of each gear set 24 is formed with a concentric gear face or segment 24a and a second concentric segmental gear face 24b of a greater radius than that of 24a. The jack shaft gear 26 of the set 24 is formed with a concentric segmental gear face 24c complemental to and meshing with the gear face 24a. The jack shaft gear is also formed with a concentric segmental gear face 24d complemental to and meshing with the segmental gear face 24b. Intermediate the jack shaft gear segments 24c and 24d the jack shaft gear 26 is formed with intermediate exaggerated teeth 24e which are complemental to sockets 24f in the vane gear 25. The effect of these exaggerated teeth 24e and the complemental sockets 24f is to effect deceleration of speed between the high and low speed of the vane gear, or to effect acceleration of speed between the low and high speed of the vane gear. When the segmental gear faces 24b and 24d are in mesh, the vane is traveling through its low speed stage of its cycle which is accelerated to high speed by engagement of one of the exaggerated teeth 24e and its complemental socket 24f to its highest speed, which is when the gear faces 24c and 24a are in mesh; then such speed is decelerated by the subsequent engagement of the other exaggerated tooth 24e and socket 24f back to its low speed stage.

The cycle of operation of each vane comprises four stages; a highest speed stage, which is the metering stage; a deceleration stage; a low speed stage and an acceleration stage. The speed ratio between the highest speed stage and the lowest speed stage is approximately two to one. However, other ratios can be employed. The deceleration stage gradually decelerates the speed of the vane from its highest speed stage to its lowest speed stage, while the acceleration stage gradually accelerates the speed of the vane from its lowest speed stage to its highest speed stage.

Referring to the drawings, and particularly to the diagrams thereof, it will be seen that in Diagram 3 the vane B has just registered with the edge XX of the inlet port. At this point it has commenced its highest speed stage. It maintains this highest speed stage until its nether face has passed the edge XXX of the intercommunicating port 11 (see Diagram 1) at which point it commences its deceleration stage. It continues to decelerate in speed until just prior to its forward edge registering with the edge XXXX of the intercommunicating port 11 (see vane A in Diagram 3) at which time it commences its lowest speed stage. It travels through its lowest speed stage until its nether edge is just past the edge X of the inlet port 27 (see vane A in Diagram 1) at which point it commences its acceleration stage, wherein it accelerates in speed until its forward edge is almost at the edge XX of the inlet port 27, at which point, as previously described, it commences its highest speed stage.

The cycle of all the vanes is precisely alike except that the cycles are relatively offset or timed as explained hereinabove. It is desired to point out, however, that the relative setting of the vanes is such that when one vane is going through its accelerating stage, the opposite vane of that cylinder is going through its deceleration stage, and likewise when one vane is going through its highest speed stage, its opposite vane is going through its lowest speed stage, so that the one offsets the other and minimizes the loss of energy.

In operation, assuming that the vane B is in the position shown in Diagram 3 in the cylinder L, it has commenced its highest speed stage, which is the metering stage. At this point the opposite vane A has commenced its lowest speed stage, so that the vane B will advance toward the vane A and seek to displace fluid through the port 11. However, no displacement will take place so long as the vane A is in a position where part of the by-pass ports 14a is exposed on both sides thereof. That is to say, there will be no actual displacement until the leading edge of vane A registers with the succeeding adjacent edges of the by-pass ports 14a. Thus, by adjusting the position of the by-pass ports 14a the effective metering or displacement stroke of the then metering or displacing vane B can be varied to vary the displacement of the cylinder L on that particular stroke. Obviously, the effective displacement stroke of the vane B will not commence until the leading edge of the vane A registers with the succeeding adjacent edges of the by-pass ports 14a, because prior to that time there is merely a by-pass of fluid around the ends of the vane A through the by-pass ports 14a. However, as soon as the registration referred to occurs, then the continued advance of vane B toward vane A causes a displacement of the entrapped fluid and discharges it into the cylinder S.

Thus, it is seen that by circumferentially adjusting the position of the ports 14a, the effective metering stroke of the vanes can be adjusted, although they retain and travel through at all times the same normal metering stroke or stage.

Precisely the same condition exists in cylinder S and precisely the same cycle is followed through, although the vanes in cylinder S and the vanes in cylinder L alternately go through the metering stage.

The by-pass ports 15a and 14a are simultaneously adjusted to effect calibration. This is effected by forming the head members 14 of cylinder L with segmental gears 14b and forming the head members 15 with two segmental gears 15b and 15c. A pinion 15d meshes with the segmental gear 15c. The shaft of this pinion is fitted with a pointer 15e cooperating with a calibrated dial 15f. Relatively fixed idler gears 8 mesh with both of the segmental gears 14b and 15b so that they will be revolved simultaneously in the same direction an equal amount. That is to say, by turning the pointer 15e, the pinion 15d transmits rotary motion to the gears 15c fixed to the head members 15. This motion is transmitted, of course, to the relatively fixed gear 15b, which in turn drives the idler gears 8. This gear in turn transmits an equal amount of rotary motion to the head members 14 through the segmental gears 14b.

Assuming that it is desired to reduce the volume of fluid discharged per cycle from the meter, the pointer 15e is turned in a counterclockwise direction with reference to Fig. 5, which moves the head members 15 in a clockwise direction and likewise moves the head members 14 in a clockwise direction. Obviously, this increases the displacement per cycle of the smaller cylinder S, but decreases the displacement per cycle of the larger cylinder L. The increase of displacement in cylinder S is less than the decrease in cylinder L, so that the combined displacement of the two cylinders will be less than it was before the adjustment.

Similarly, if the pointer 15e is moved in the opposite direction, the head members 15 will be revolved in a counterclockwise direction to decrease the displacement per cycle of cylinder S and the head members 14 will be turned in a counterclockwise direction to increase the displacement per cycle of cylinder L. The increase of displacement per cycle of cylinder L will be greater than the decrease in displacement per cycle of the cylinder S so that a total increase in displacement of the meter will be effected.

It will be obvious from this description and from an understanding of the operation of the vanes that the combined effective angle of displacement in the two cylinders will total 120 degrees at all times, but in that the displacement relative to angle of movement in one cylinder is less than in the other, variation of the angularity of the effective stroke of the two will result in either an increase or decrease in the total volume discharge, as previously described.

Obviously, from the description of the cycle of operation of the individual vane and the timing thereof, there is no tendency either to compress fluid between the vanes or to create a vacuum between them, because when there is relative movement between the two vanes of either cylinder, the same are either in communication with the inlet port or with the outlet port. Likewise, it is obvious that there is no tendency to compress fluid from cylinder L into a confined space in cylinder S.

Although the areas of the vanes presented to the inlet port are equal, the favorable gear ratio between the driving vane and the other vanes is such that they will be driven by the driving vane until they in turn assume the driving role.

Inasmuch as the jack shaft 19 is driven at a speed in fixed relation to the highest speed stage of the vanes, it will, of course, rotate at a constant speed for each inlet pressure. As this jack shaft is operatively connected to a counter, the counter will count its revolutions and translate the number of its revolutions into gallons or other units of measure, and by adjusting the position of the ports 14a and 15a through the medium of the pointer 15e, as previously described, the meter may be calibrated so that the amount discharged will be in precise accord with the indication of the counter.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, the improvement which comprises means for varying the time of commencement of the effective metering of each vane during its metering stage.

2. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, the improvement which comprises by-pass means in each chamber and circumferentially adjustable therein to vary the effective duration of the metering stage.

3. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, the improvement which comprises by-pass means in each chamber and circumferentially adjustable therein to vary the effective duration of the metering stage, and means interconnecting said by-pass means effective to simultaneously adjust said by-pass means to a like extent but opposite in effect whereby the effective duration of the metering stage will be increased in one chamber and decreased in the other.

4. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, and wherein displacement is effected by the vanes in one chamber and then by the vanes in the other chamber in alternation, the improvement which comprises by-pass means in each chamber and circumferentially adjustable therein to vary the effective metering stage.

5. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, the improvement which comprises circumferentially adjustable members in said chambers having by-pass ports therein, the circumferential positions of which ports determine the duration of fluid displacement by each vane during its metering stage, and means for adjusting said members to adjust the position of said ports.

6. In a rotary meter of the character described comprising a pair of intercommunicating chambers, a pair of vanes rotatable in each chamber and interconnecting means operatively connecting said vanes to impose on each vane a vane cycle comprising, in sequence, a constant highest speed metering stage, a deceleration stage, a constant lowest speed stage and an accelerating stage, and upon all of the vanes a meter cycle timing the vane cycles 90° apart, the improvement which comprises circumferentially adjustable members in said chambers having by-pass ports therein, the circumferential positions of which ports determine the duration of fluid displacement by each vane during its metering stage, and means for adjusting said members to adjust the position of said ports, said means adjusting said members simultaneously to a like extent but opposite in effect whereby the duration of fluid displacement will be increased in one chamber and decreased in the other chamber.

WILLIAM F. BERCK.

REFERENCES CITED

The following references are of record in the file of this patent:

UNITED STATES PATENTS

| Number | Name | Date |
|---|---|---|
| 981,660 | Kinney | Jan. 17, 1911 |
| 1,234,392 | Roberts | July 24, 1917 |
| 1,952,882 | Morgan | Mar. 27, 1934 |
| 2,196,669 | Renfrew | Apr. 9, 1940 |
| 2,309,443 | Cuthbert | Jan. 26, 1943 |